Figure 1:
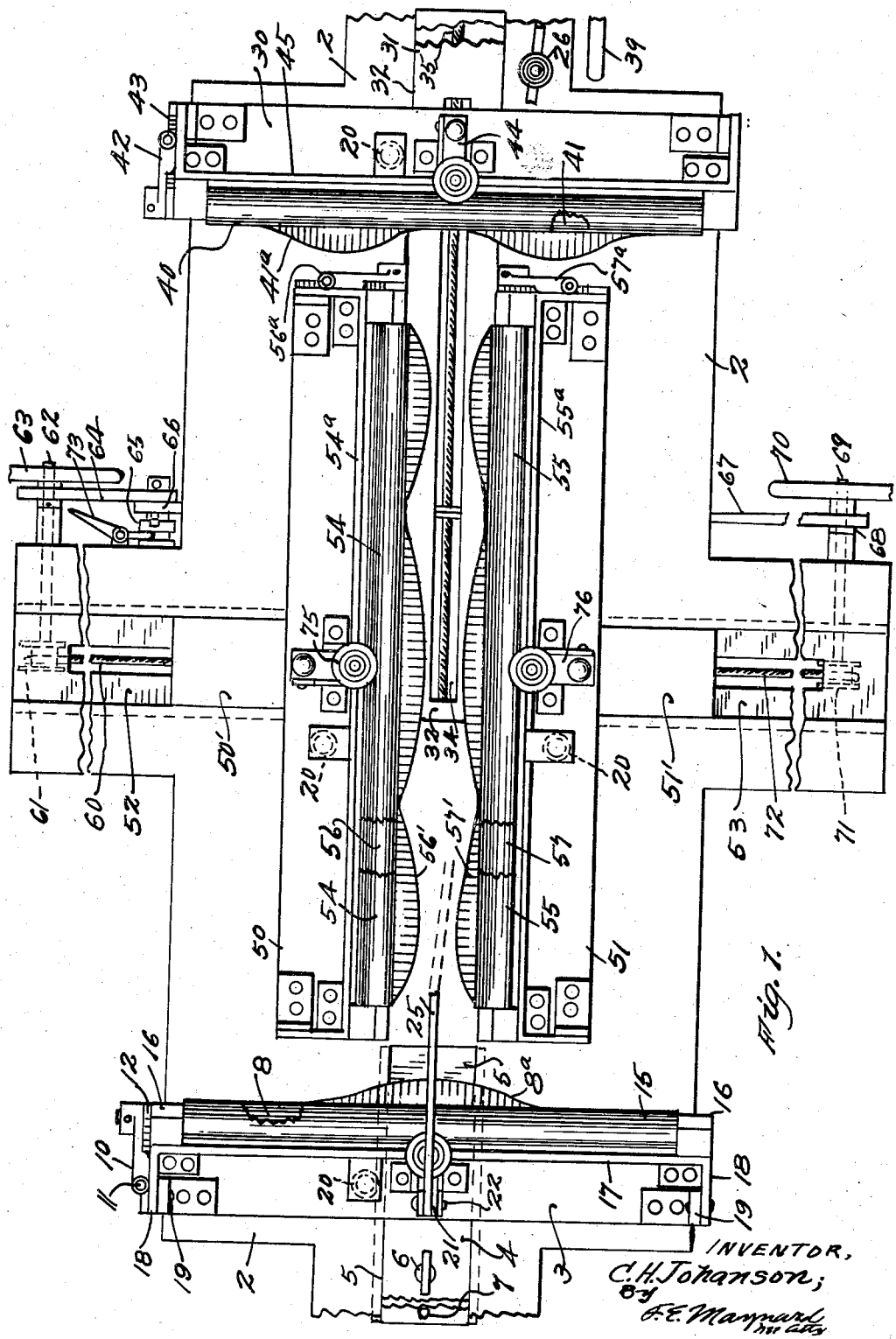

Jan. 17, 1939.     C. H. JOHANSON     2,144,585
UNIFORM GLOVE SKIN STRETCH DISTRIBUTOR AND METHOD
Filed Aug. 17, 1936     3 Sheets-Sheet 1

INVENTOR,
C. H. Johanson;

Jan. 17, 1939.  C. H. JOHANSON  2,144,585
UNIFORM GLOVE SKIN STRETCH DISTRIBUTOR AND METHOD
Filed Aug. 17, 1936  3 Sheets-Sheet 2
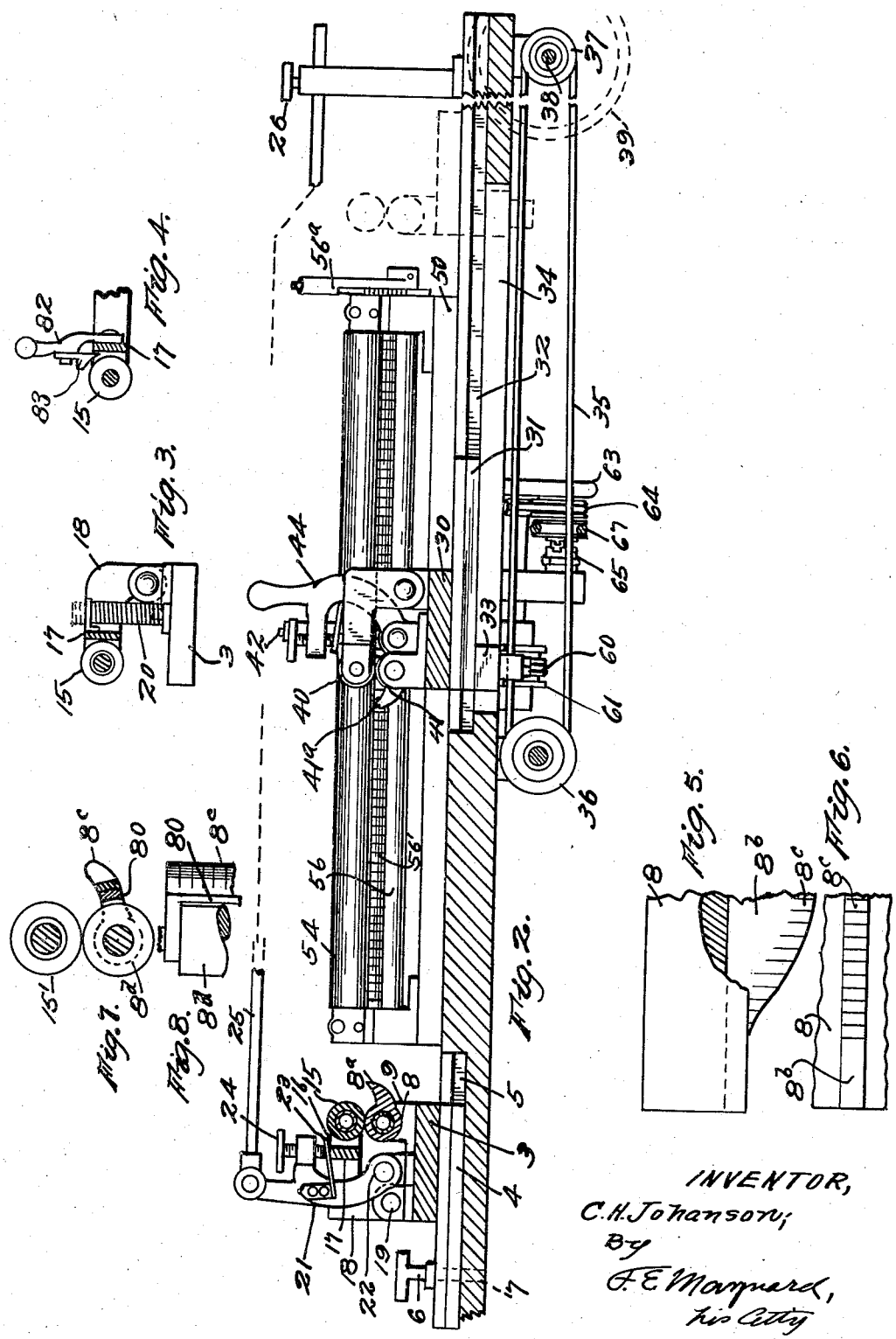
INVENTOR,
C. H. Johanson;
By
F. E. Maynard,
his Atty

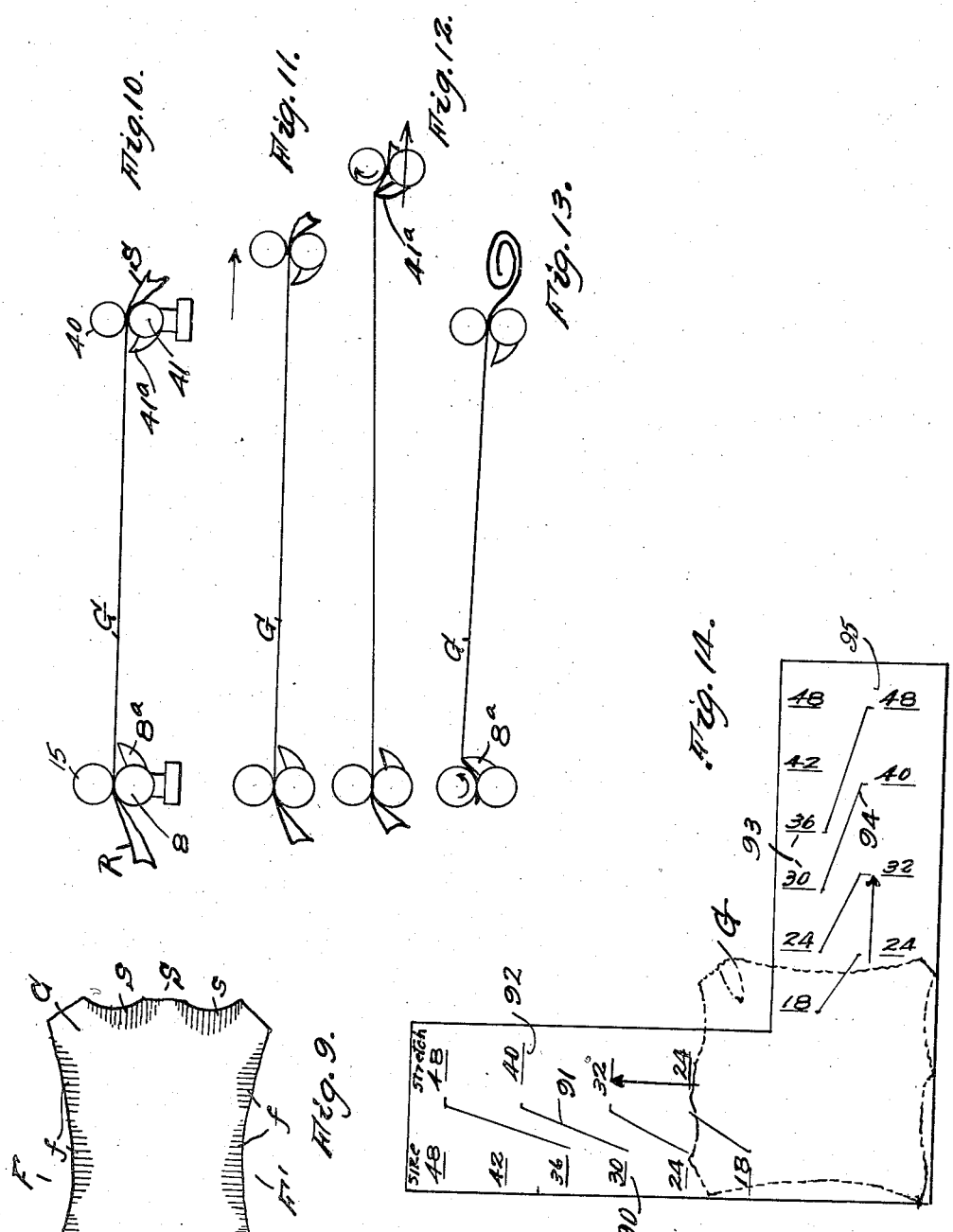

Patented Jan. 17, 1939

2,144,585

UNITED STATES PATENT OFFICE 2,144,585

UNIFORM GLOVE SKIN STRETCH DISTRIBUTOR AND METHOD

Carl Hugo Johanson, Los Angeles, Calif., assignor to Olivia S. Johanson, Los Angeles, Calif.

Application August 17, 1936, Serial No. 96,415

11 Claims. (Cl. 149—21)

This invention is an apparatus and method for the preparation of glove skins or other suitable material for the cutting out of the several pieces going into the structure of hand fitting gloves.

It has long been the practice to moisten the commercial skin and then proceed with a manual stretching process to work out the skin and give it a condition ready for the cutting out of the desired blanks. The operator grasped opposite extremities of the skin in his hands and then tensioned that portion extending from hand to hand, a portion about four inches wide, with a pull of fifty pounds more or less, and at the same time reciprocating the skin from hand to hand over the corner of the work bench. When the artisan judges that all the "stretch" has been taken out of that portion of the skin extending from hand to hand he then takes a fresh grip on the next adjacent four inch portion at the same opposite edges of the skin and makes another stretching operation, and repeats until he has stretched the whole skin, one way all over.

After the skin has been thus stretched the operator then follows the same procedure in a transverse direction throughout the skin by pulling successive four inch zones one after the other. This contracts the skin on lines reverse to the first pulling treatment; that is it shortens the skin that was elongated. It will be seen that there is no certainty that the skin has been uniformly stretched in either direction; or that there is any uniformity in the degree of latent stretch which the cutter must rely upon for obtaining the desired degree of leather or stretch in a given blank which is cut from the stretched skin. In other words the stretch is different in different areas of the skin. This is an obvious disadvantage incident to the tedious, indefinite and uncertain hand method of stretching the skin, increased by fatigue of the operator. Commercial skins vary in size from two square to twelve square feet, and the smaller skins are over stretched. Only by years of experience can the operator approach desired uniform distribution of stretch of leather in the skin.

Therefore, an object of this invention is to provide a method and means whereby to produce a glove skin in which the stretch is distributed in substantially uniform degree throughout the skin, far more evenly than is possible by hand labor.

An object is to provide for pulling a skin in one direction in one operation throughout a large area extending from one margin to the opposite margin for the full width across the skin between the said margins with a uniform degree of tension from margin to margin, and to provide for then subjecting the skin in one operation to tension substantially throughout its area in a direction transverse to the direction of the first tensioning effort, in each pull providing for the careful control of the amount of tension so as to provide for a desired amount of latent stretch either way in the blanks cut from the skin, as will be set forth below.

An object is to provide for the tensioning of the skin in such a manner that those areas of the skin where the material is thick may be worked out with a higher degree of tension than where the skin may be thinner and require less tension, and further to provide for the direct or local application of tension to certain portions where there is known to be a greater capacity of stretch, as in the shoulders, the center of the rump, and in the belly flank edges of the skin, and which will be called herein the sides of the skin, while the shoulder and the rump will be called the ends of the skin, for convenience of description. The term "glove skin" is here intended to include all other stretchable material used in the manufacture of hand-fitting gloves.

Broadly, an object is to provide a method and means to eliminate the objectionable features of manually stretched glove skins by creating a product in which the latent stretch is far more evenly distributed; to do this with a minimum of hand labor, and in a much shorter period of time per skin operation. And to provide an apparatus for the stated purpose which is simple, practical, easily operative and involves but a minimum of handling operations.

Aside from the several principal objectives above outlined the invention consists of numerous other advancements in this art as set forth in the ensuing disclosure and having additional objects and advantages as hereinafter developed, and whose construction, combination and details of means, and the manner of operation and method of production will be made manifest in the description of the herewith illustrative embodiment; it being understood that modifications, variations and adaptations may be resorted to within the scope, principle and spirit of the invention as it is more directly claimed hereinbelow.

Fig. 1 is a broken-away plan of the machine, showing the transverse tensioning grip means in inner position to grip a skin longitudinally. Fig. 2 is a central, longitudinal section of the machine showing parts in elevation; the shoulder gripping means being shifted inward to starting position. Fig. 3 is a cross section of an upper gripping roller support. Fig. 4 is a detail of a roller brake. Figs. 5 and 6 are respectively a plan, partly in section, and an edge elevation of a stretching web device; in part. Fig. 7 is an elevational section and Fig. 8 a fragmentary plan of a stretching device of modified form. Fig. 9 is a plan of a glove skin. Figs. 10 to 13 inclusive diagrammatically show successive positions of a pair of the gripping devices in one stretching operation. Fig. 14 is a plan of a size and stretch scale or guide.

There is shown a glove skin G which has been uniformly stretched in one operation by even tension between means gripping the rump end R and the shoulder end S from belly flank side F' to the opposite flank edge F' so that the whole area of the skin extending between the gripping means, later described, is characterized by an even distribution of stretched material. Preferably the skin is not stretched to the maximum degree lengthwise so that there still remains some lengthwise, potential stretch of desired ratio to a glove measure unit so that the blanks for a glove, when cut from the prepared skin, will have capacity for stretch along the back of the hand. This is an important feature for its purpose is to provide for the closing of the wearer's hand in the ultimate glove without pulling of the back of the glove up the back of the hand and to avoid the wrinkling of the fingers and glove back which is incident to gloves which are made up of backs which have been stretched, as is the general common trade practice, longitudinally to such a degree that the glove back has no such capacity for stretch on the hand as is secured by the present invention.

A shaded zone r in the rump R indicates a portion of the skin to which it is desirable to give a special stretching treatment to place therein an equal degree of stretch with the main or large proportion of the skin. Shaded zones s—s at the shoulder end, and shaded zones f at the flanks or sides or belly portion of the skin are likewise to be specially tensioned to equalize the potential stretch therein with the main area of the skin.

The longitudinally stretched skin is then gripped by means extending continuously along its flanks, or just beyond each side of the center of the thick back portion extending from the rump to the neck or shoulder end and this area from free edge to free edge at each end R to S is in one operation uniformly tensioned by relatively separating the gripping means. This transverse stretching of the longitudinally stretched skin results in its contraction longitudinally to a degree determined by the degree of transverse stretch. This latter is in an amount of predetermined ratio to a given unit of measure so that in the cut blanks these will be stretchable across the hand so much to the unit as will be required for the true size of a given size of glove. Hence the glove will have inherent capacity for cross and length stretch.

An apparatus is here shown as including a substantial table or horizontal frame or bench 2 one end of which is provided with a transverse carrier or beam 3 having a fixed slide 4 slidably adjustable in slideways 5 on the longitudinal axis of the table.

A fastening key of suitable nature, as a pin 6, is adapted to be inserted in one of a series of pin holes 7 in the table to fasten the beam 3 at a desired position. This beam is provided with means to receive, grip and tension the applied end, as R, of a skin G. The means is shown as including a lower, elongated element 8 in the form of a cylinder whose ends are supported in bearings 9 fixed on the ends of the beam 3. The element 8 may be of rubber and as shown in Fig. 1, has a laterally projecting, longitudinally extending web or fin 8ª which may be moved up from the position shown by means of a hand lever 10 fixed to the shaft end of the element, Fig. 1. This lever 10 is provided with a suitable locking latch 11 engageable with the teeth of a rack segment 12 fixed on the beam 3 so that the web 8ª and its cylinder may be locked at desired position.

Extending along and above the element 8 is a complementary elongated, rubber or rubber jacketed roller 15 having end trunnions mounted in bearings 16 provided on the adjacent face of a bar 17 having rearwardly and downwardly directed arms 18 suitably pivoted at 19 on the beam 3. In Fig. 3 there is shown a spring 20 normally pressing the roller bar 17 upward just out of contact with the lower element 8 between which and the upper roller the rump end R of a skin G may be smoothly laid. To facilitate the insertion of the skin the roller bar 17 may be tilted back out of the way by the operator of the machine.

Means are provided by which to forcibly press the upper roller down onto the lower, skin resting element 8 so that these will cooperate to form a gripping device to hold the inserted margin of the skin continuously from one side edge to the other. For this purpose a lever arm 21 is pivoted at 22 on the beam 3 and has a variable spring contact 23 which is adjusted by a set screw 24 in the arm and is designed to be brought over into engagement with a part of the roller bar 17 in its gripping position and determine the degree of pressure with which the roller 15 is pressed onto the inserted glove skin. The arm 21 has a link 25 extended to the opposite end of the table 2 so that an operator there may throw off the pressure arm 21 at will. The link 25 may be secured at desired position under a set or clamp screw 26, in the nature of a tool post clamp.

On the opposite or skin shoulder gripping end of the machine the table is provided with a cross beam 30 having a slide 31 slidable in slideways 32 along the axis of the table; the slide having a bottom block 33 running in a table channel 34 and being firmly attached to a suitable means whereby the slide beam 30 may be positively moved in either direction toward or from the skin clamping device mounted on the remote carrier or beam 3; the beams 3 and 30 being in the present machine in parallel relation and movable only to change the spatial distance. The block 33 is shown as attached to a flexible belt 35 running over an idle wheel 36 hung under the table at the inner end of the channel 34 and extending thence forward to a drum 37 on which it is wrapped to obtain friction. The drum 37 is fixed on a cross-shaft 38 on which is secured a hand wheel 39 by the operation of which the operator at the shoulder of the table may effect the shift of the attached slide beam 30 to inner position, Fig. 2, in such relation to the rump slide 3 as to permit the insertion of a short skin G between an upper roller 40 and a lower parallel element 41 which are generally similar to the gripping roller 15 and its opposed lower skin resting element 8, and are mounted on their carrier beam 30 in a like manner; one end of the lower element 41 having an attached locking lever 42 to engage with a relative rack segment 43 fixed on its beam 30. The upper roller 40 is pressed to gripping position by a lever 44 pivoted on the beam 30 and acting in the same manner as the clamp lever 21. The upper roller 40 is supported on a yieldable and tiltable bar 45 of the same type as the bar 17 and may be thrown back clear of the lower, complementary gripping element 41 to facilitate the quick insertion of the adjacent transverse margin of a skin in a smooth position from one side edge of the skin to the other for a continuous grip in the device for the length of the margin.

With a skin gripped in and extending from the rump grip means to the shoulder grip means, the operator turns the hand wheel 39 gradually to pull the slide beam 30 away from the stationary rump holding means 8—15 so that the entire area of the skin between the gripping means is subjected to a uniform degree of tension and the stretch is distributed evenly throughout all the tensioned leather. It is preferred not to stretch the skin lengthwise to its reasonable limit but to leave some degree of stretch for elongation of the finished glove on the wearer's hand.

The web 8ª, Fig. 2, is so designed and arranged that when the gripping elements 8—15 are released to allow the rump margin of the interposed skin G to be pulled through, the web 8ª may be tilted up by its lever 10 to firmly press the engaged skin at the zone r to specially tension this to equalize its leather stretch with that of the main body of the skin. This effect is secured by the further and continuous retraction of the pulling slide 30, while its gripping device is closed on the skin.

When the rump end of the skin G has been so worked out by the special web 8ª the rump end is again arranged and caught in the gripping device 8—15 on the rump beam 3 and while so gripped the shoulder beam 30 is continued in its outward movement as to the stationary slide beam 3 and at the same time the pressure lever 44 is shifted to release the roller 40 so that this may turn while at the same time the handle 42 of the member 41 is shifted so as to tilt upward special contoured webs 41ª provided along the member 41 and designed and arranged to press up against the shoulder zones s—s of the neck end of the skin G; whereby to give these zones the desired distribution of latent stretch. This operation effects the desired degree of stretch of the whole skin longitudinally; from rump to neck in one substantially continuous operation the tension being uniform and substantially parallel to the side edges of the skin, the full width of the skin being operated on in the one treatment in contrast to the succession of treatments of longitudinal zones with various degrees of hand power or tension between the outstretched arms of an operative, who may be male or female.

The skin having been so tensioned lengthwise, the slides 3—30 are relatively separated to such a degree as will allow the skin to be mounted and gripped in means which are operable to apply the desired degree of transverse tension to the skin, in the same machine, immediately following the "first" or lengthening stretch just above described, to take advantage of its moistened state.

The transverse gripping and tensioning means include a pair of longitudinal, parallel slide beams 50 and 51 having respective slides 50' and 51' operating in slideways 52—53 in the table 2. These beams are provided with respective skin gripping means substantially similar to the rump and shoulder gripping means and include upper rollers 54 and 55 lying along and above lower rest members 56 and 57, respectively; this set of gripping means being materially longer than the end set gripping the rump and the shoulder for the reason that the longitudinal gripping means operate on the now elongated skin given by the first treatment.

The grip carrying beam 50 is now moved inward by suitable means such as an endless belt 60 attached to the slide 50' and binding on a drum 61 mounted under the table 2 and having a shaft 62 turnable by a hand wheel 63 at the shoulder side of the table to be conveniently manipulated by the operator. To secure the concurrent inward shift of the opposite beam 51 to bring its grip device in toward the axis of the table, if so desired, the two beams 50—51 are adapted to be mechanically connected for coaction either inwardly or outwardly.

To this object the shaft 62 is provided with a transmission connection 64, such as a sprocket chain device, driving a clutch part 65 for a transmission device 66 including a reverse drive belt 67 engaging a sprocket wheel 68 fixed on a shaft 69 mounted under the side of the table remote from the slide 52. The shaft 69 has a hand wheel 70 on the shoulder side of the table 2 and has a drum 71 driving a belt 72 which is connected to the relative slide 51'.

When it is desired to shift both slides 51' and 50' inward at one time or outward at one time the operator throws a lever 73 to close the clutch element 65 into mesh with the free transmission wheel 66 of the belt 67 which will now drive the shaft 69, and thereby effect shift of the two slides 50'—51' at one time. If the clutch 65 is not closed the slides 50'—51' may be shifted independently in either direction as to the center of the table.

The beams 50—51 are shown in Fig. 1 as arranged in inwardly adjusted positions for the purpose of permitting the mounting of a first elongated skin between the gripping means so that these will be closed upon the skin on parallel lines adjacent to the thick, longitudinal back of the skin to which is given a degree of tension somewhat higher than the usually thinner flanks.

As soon as the skin is smoothly laid in and between the opposed gripping devices on the beams 50—51 levers 75 and 76 of clamp means similar to that of lever 21, are closed on the mounting bars 54ª and 55ª of the relative rollers 54—55 to firmly press them down on the interposed skin and the beam slides are then moved outward together or singly as desired to impart a suitable degree of transverse tension to the longitudinal, central portion of the back of the skin. Then the gripping pressure may be somewhat released in one of the gripping devices 54—56 or 55—57 and this is shifted outward by its slide, while the opposite gripping device remains still, for the purpose of tensioning of one flank side to the suitable degree, after which the other flank is worked out by a similar procedure. Both flanks may be drawn at the same time if found desirable. Release of pressure of the upper rollers in the several gripping devices reduces the tension and allows the rollers to rotate with a reduction of sliding friction on the skin.

The lower gripping elements 56—57 are provided with special tensioning webs 56'—57' respectively to be moved by end levers 56a—57a to press against the zones f—f along the flank edges of the skin for the equal distribution of the stretch in the local leather. When the zones f of one side flank are being treated the skin is firmly held in the gripping device of the opposite side, this being closed on the skin at any desired longitudinal line along the skin, the distance of which from the edge of the flank being treated varying with different skins.

It will be seen therefore, that the present method and machine in two operations longitudinally and transversely stretches the entire skin, in each step with a substantially controlled degree of tension, and in each step evenly distributing the stretch throughout the skin.

In Figs. 5 and 6 the special tensioning device includes a strip of firm, but flexible rubber 8b fixed in the lower gripping element 8 and having its outer edge slit to form short, adjacent fingers 8c to engage the skin at the given zones r; this form of web being employed also on the other zones s and f.

In Figs. 7 and 8, the special tensioning fingers 8c are attached to an elongated strip 8d mounted on the shaft of the lower grip element 8d for independent uptilting action as to the element 8d which in this form is a free roller cooperating with the upper roller 15'; it being understood that this embodiment of gripping means may be employed throughout on the several slide beams, if so desired.

Figs. 10 to 13, inclusive, show successive positions of the opposed set of gripping device for longitudinally (or transversely) stretching the main area of the skin and the special web finger treatment of the stated zones r, s or f, as the case may be.

If desired a suitable brake may be employed to firmly secure the upper gripping rollers against rotation when clamping a skin. In Fig. 4 is shown a lever 82 pivoted on a roller bar (as 17) and carrying a pivoted wedge 83 which may be jammed down between the roller 15 and the bar to act as a brake on the roller.

The first tensioning of the skin to stretch it, say to increase it by a ratio of one third, may be either way of the skin but it is preferred to work it out transversely first by setting the long rollers 55—54 in close to the center of the thick back of the skin to initially apply the higher degree of tension along this area, then the flanks are uniformly tensioned to evenly distribute the latent stretch over the whole skin. The skin is then clamped between the rump and the shoulder engaging rollers 15—40 and a uniform longitudinal tension exerted to obtain an increase of about one-third in its length, if this be the stretch ratio adopted. That is skins may be readily stretched along their length from eighteen inches original to a stretched length of twenty-four inches, and so on up according to the original length of the skin. The same ratio of stretch is available in the skin for its stretch transverse to the initial line of stretch. By use of a plotted table chart laid off for the ratio of longitudinal and transverse stretch desired it will be seen that the operator can rapidly by this machine produce glove skins of the desired evenness of latent stretch all through. Such a table chart is shown in Fig. 14 where a "size" column 90 of inch marks or indices have indicators 91 to "stretch" indices 92 for ratio of stretch for the length of a skin. Transverse to the length indicator there is a "size" column 93 for the width of the skin with indicators 94 to stretch indives 95 for ratio of stretch. The operator may stretch the skin either way as the condition of the skin determines for the best cutting results.

The first stretch is up to the given ratio as based on the original size of the skin, and somewhat less than the breaking or tearing limit, and the next stretch transverse to the first draws out the contracted skin to the desired ratio as to its original dimension and less than the tearing limit in that direction so as to leave some stretch in the skin in the direction of the last stretch. Now by cutting the glove blanks from the skin with their lengths in the direction of last stretch it will be seen that the backs, when sewed into the glove, will have capacity for lengthwise stretch as the wearer's hand is closed in them. This is a distinct improvement over the old method of taking up all of the stretch possible in the final tensioning step thus prohibiting finger and back stretch in the ultimate glove.

What is claimed is:

1. Apparatus for uniformly stretching a glove skin throughout in one operation from margin to margin between two opposite sides of the skin, including elongate devices for gripping respective opposite margins of the skin along continuous lines and including means for applying local tension to certain portions of the skin during the operation of stretching, and means for relatively separating the said devices to elongate the skin substantially parallel to the free edges extending from device to device; said local tension means including parts arranged between the gripping devices and presenting elongate edges to transversely engage and slidably support contiguous portions of the skin being tensioned and said part edges including longitudinally, convexly curved portions whereby differential degrees of tension is set up across the skin from one gripping means to the other at different zones between the skin edges at the ends of the gripping means.

2. Skin stretching apparatus including a table having guides provided with a set of parallel, relatively separable slides each provided with a pair of elongate, relatively movable gripping elements closable frictionally upon interposed medial portions of the skin adjacent its central zone and extending from side edge to side edge thereof to grip the skin while it is placed under uniform tension by relative separation of the said slides and for slidably releasing either end of the skin being stretched or both ends and one of said elements having a row of cushioning parts for differentially stretching the skin in zones from one gripping means to the other.

3. Apparatus for stretching glove skin from a central zones thereof outwardly to parallel edges; comprising a pair of oppositely arranged, gripping means movable into juxtaposition and each including elongate, cooperative bed and pressure elements separable to provide for introduction of the skin while said means are juxtaposed so that the elements may be closed on a central or medial zone of the skin with the remaining portions free outwardly from the respective gripping means, means for closing the gripping or pressure elements to frictionally hold the skin and to provide for slipping thereof at will, and supporting parts coordinate to said gripping means and presenting resilient elongate, arch edges to engage and slidably and yieldably support contiguous portions of the skin during stretching to differentially tension the same at zones across the skin, and means for relatively separating the closed gripping means to tension the skin.

4. In a glove skin stretching machine, a frictionally acting gripping device including an elongate presser member and an elongate element on which a portion of the skin to be stretched may be applied and gripped thereto by said member; said element having a laterally and longitudinally extending part adapted to be moved upward to engage and tension a given area of the skin passing between said member and said element during the stretching operation.

5. In a sheet stretching machine, a pair of cooperative elements closable to grip an interposed portion of the sheet on a continuous line from edge to edge; one of said elements having a part movable to engage and tension a given area of the sheet during the stretching operation, and in which said part includes a row of flexible tensioning fingers to engage the skin.

6. Sheet stretching apparatus including a table having a pair of opposite, guided slides and means for concurrently moving the slides, each slide having an elongate lower bed forming element, the elements being substantially, relatively parallel and transverse to the motions of the slides and presenting continuous top-line portions over which the skin may be draped from one element to the other, and upper elongate presser members movably connected to the slides to be opened from or closed to the relative elements for insertion of and gripping upon a sheet, and control means to close the presser members to non-slidably hold the sheet while it is tensioned by relative separation of the slides, or to reduce the pressure and permit the gripped sheet to slip while it is being tensioned from one bed element to the other and resilient means for effecting differential zone tension on the sheet while gripped and stretched.

7. Apparatus as set forth, having opposed sheet-gripping means including a row of cushioning fingers with tips in an arc along the row to specially tension given portions of the sheet extending between the said means gripping the sheet.

8. Means to grip on relatively spaced portions of a sheet along opposite, substantially continuous lines thereof, including frictional clamping devices which are relatively separable whereby to stretch the sheet clamped therebetween, and each including a row of resilient cushions presenting sheet gripping faces in a curved line whereby to specially tension given area of the gripped and stretched sheet.

9. In a skin stretching apparatus; a frame having guides provided with opposed devices movable into juxtaposition and including in each, a bed element and a presser element relatively separable for arrangement of the medial part of a skin between the two devices with the remaining portions of the skin draped free outwardly from the bed elements in juxtaposition, and said devices operative to grip the skin on continuous lines at the medial portion from edge to edge thereof, that is to the ends of said portion, each of said devices including skin supports having elongate bowed edges for differentially tensioning zones of the skin between said supports while the skin is drawn, and means for relatively separating the said devices to tension the gripped skin.

10. In a glove skin stretching machine, a pair of cooperative elements closable to grip an interposed portion of the skin on a continuous line from edge to edge of the skin; one of said elements having a part provided with an elongate row of relatively yieldable cushions reactive against the applied skin to differentially tension it as drawn between the closed elements.

11. A machine as in claim 10, and in which the outer ends of the cushions lie in a curved line along the row.

CARL HUGO JOHANSON.